Sept. 22, 1970  M. D. ANDERSON  3,529,377

ANIMAL TRAP

Filed Dec. 13, 1968

Melvin D. Anderson
INVENTOR.

BY Clarence A. O'Brien
and Harvey B. Jacobson
Attorneys

United States Patent Office 3,529,377
Patented Sept. 22, 1970

3,529,377
ANIMAL TRAP
Melvin D. Anderson, Ontario, Oreg. (1547 6th St., NW., Salem, Oreg. 97304)
Filed Dec. 13, 1968, Ser. No. 783,475
Int. Cl. A01m 23/26
U.S. Cl. 43—91                                   8 Claims

ABSTRACT OF THE DISCLOSURE

A portable base panel is provided at its ends with spring-loaded jaw traps either one or both of which function to catch gophers and similar burrowing rodents. Both traps are alike and are supported at the respective ends of the panel. Each trap comprises arcuate jaws which grapple the entrapped animal. Sensitive animal actuated triggers carry the bait and are novelly constructed to trip toggle-type linkage means which, in turn, releases the spring-loaded jaws.

This invention relates to a mechanical trap which is adapted to be manually set and animal actuated and is expressly designed and constructed to catch burrowing rodents such as gophers and the like and has to do with a single elongated base panel which is provided at its opposite ends with duplicate traps each characterized by opposed curvate spring-biased lethal jaws which when tripped grapple and squeeze the victim in an acceptably humane manner and without damaging the pelt.

As will be hereinafter more fully clarified, the dual or twin trap aspect of the concept is significantly important in order that two animals approaching the overall trap from opposite ends can be caught. However, it is an equally important object of the invention to provide an adaptation wherein each trap is structurally, functionally and capably unique.

Briefly, the improved trap comprises an elongated portable panel which is ordinarily rectangular in plan and is provided with flat top and bottom surfaces and is self-standing. This panel is broadly referred to as a base and has like end portions and an intervening centralized body portion. Individual self-contained manually set traps are located and operatively mounted atop the respective end portions of the panel. Each trap is characterized by a pair of opposed complemental body embracing, grappling and spring-biased jaws. When brought into play these jaws grab and squeeze the animal. The respective paired jaws are situated just slightly inwardly of the adjacent transverse marginal edge of the base panel. Animal actuated jaw setting and releasing means for the individual traps is operatively cooperable with the specially constructed centralized body portion of the panel.

In carrying out a preferred embodiment of the invention each end portion of the panel is provided adjacent its respective longitudinal marginal edges with appropriately aligned and paired bearing brackets and these brackets serve to mount and hold down a pair of horizontal spaced parallel rock shafts which have inward and outward ends. The outward ends are provided with laterally disposed upstanding animal embracing and grappling jaws. The inward ends have laterally directed upstanding crank-like rocker arms. The rock shafts are mounted in the brackets for angular rotation and are provided with appropriate coil springs. The coil springs encircle the rock shafts and have outer ends connected with the median portions of the jaws and inner ends anchored on predetermined coating portions of the panel. A trigger supporting and elevating block is fixed atop the panel and is spaced inwardly from a cooperating end of the trap-equipped base panel. Linkage means is provided and embodies first and second links which bridge the block and have outer ends hingedly connected with the upper ends of the rocker arms. This linkage means provides a suitable toggle joint between the rocker arms with the pivot point normally set below center so that it can be acted on by a cooperating leg of an adjacent operatively mounted animal actuated trigger. The trigger is constructed to accommodate suitable bait.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The aforementioned base panel is denoted by the numeral 6 and is preferably but not necessarily rectangular in plan and has a flat bottom surface 8 and a flat top surface 10. The longitudinaal marginal edges are denoted at 12 and the transverse marginal edges are denoted at 14. The thus constructed panel is herein set forth as having corresponding end portions and an intervening centralized body portion. The centralized body portion is provided with a substantially rectangular block 16 which is fixedly mounted and provides a riser in a manner to be more explicitly set forth.

Figure 1:
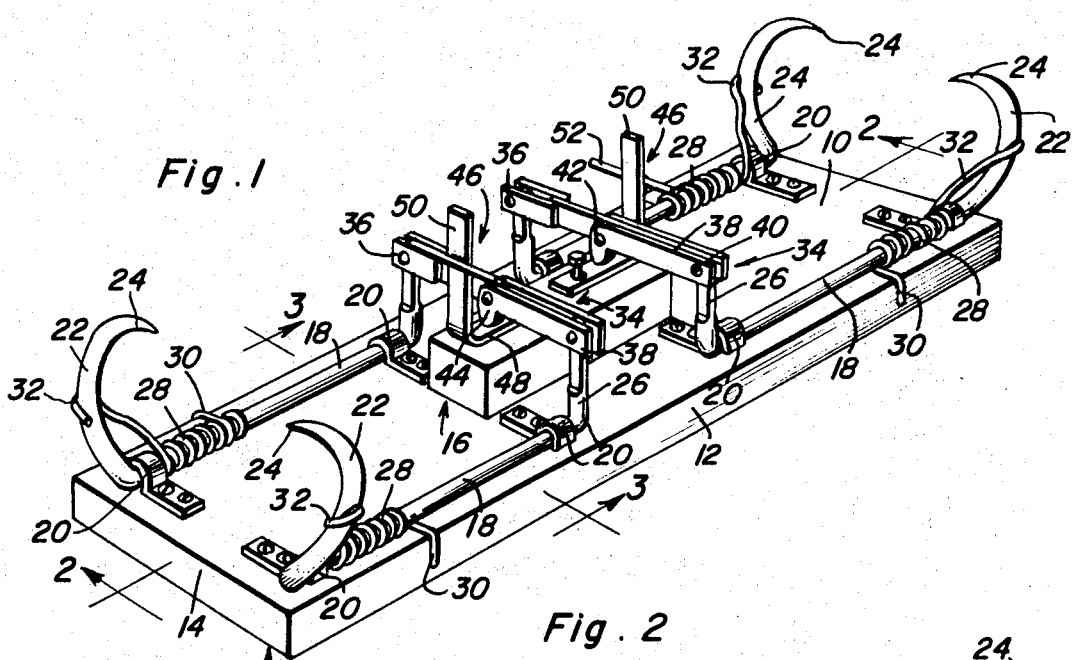
FIG. 1 is a view in perspective of a dual purpose burrowing animal trap constructed in accordance with the principles of the present invention and showing the traps at the respective ends of the panel set and thus readied for use.

Each end portion of the base panel is provided with manually set animal actuated body grappling trap means. Inasmuch as each trap means is the same in construction a description of one will suffice for both. Taking up the trap at the left in FIG. 1 will be noted that elongated rod members are constructed to provide a pair of spaced parallel coplanar rockshafts 18. The end portions of these rockshafts are operatively mounted for angular rotation on the top surface by way of suitable bearing brackets 20. These bearing brackets are paired and aligned and serve to anchor each rockshaft while at the same time permitting it to rotate from a position such as shown in FIGS. 1 and 3 to a position shown in FIG. 4. The outer end of the rockshaft is provided with an arcuately curved animal embracing jaw 22. This jaw has its upper end gradually tapering to a bill-like point 24. The inward end of the rockshaft is provided with an upstanding rocker arm 26 which can also be referred to as a crank arm. That end of the rockshaft adjacent the jaw is surrounded by a coil spring 28 having one end anchored over the marginal edge 12 as denoted at 30. The other end portion is secured to a median part of the jaw as denoted at 32. The springs are tensioned in such a manner that the user can catch hold of the two jaws and spread them apart so that they can be set in readiness to make a catch. The jaws and rockshafts are held in this open position by way of novel linkage means denoted generally by the numeral 34. More specifically the linkage means comprises a link at the left in FIG. 1 which is hingedly connected as at 36. The complemental or companion links 38 at the right in FIG. 1 are pivotally connected as at 40 to the cooperating rocker arm. The adjacent inner ends of the respective links are overlapped and pivotally connected to each other at 42. It will be noted that the links 38 are provided with depending cam-like detents. The thus constructed linkage means provides a toggle joint connection between the upstanding rocker arms 26 when the trap is set and ready to function as illustrated in FIGS. 1 to 3 inclusive.

Figure 5:
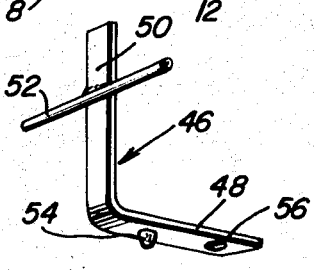
FIG. 5 is a view in perspective of one of the triggers. triggers.

The aforementioned cam-like detents are herein designated at 44 and when in set position they cooperate with a highly sensitive animal actuated trigger 46. This trigger is preferably L-shaped as clearly shown in FIG. 5 and is characterized by a horizontal bottom arm 48 and an upstanding trippable arm 50. The arm 50 is provided short of the upper and with a suitably attached cross pin 52 which can be easily baited (not shown) and which also facilitates tripping the trap when actuated by pressure from the animal attempting to devour the bait. With further reference to FIG. 5 it will be seen that the underneath intermediate portion of the bottom arm is provided with an integral suitably shaped and proportioned lug which constitutes a fulcrum 54 and which rests atop the underlying surface of the support block 16. The free end portion of the arm 48 is provided with an elongated slot 56 which is operatively connected with the block by way of a headed pin or fastener 58 as perhaps best shown in FIG. 2.

Figure 2:
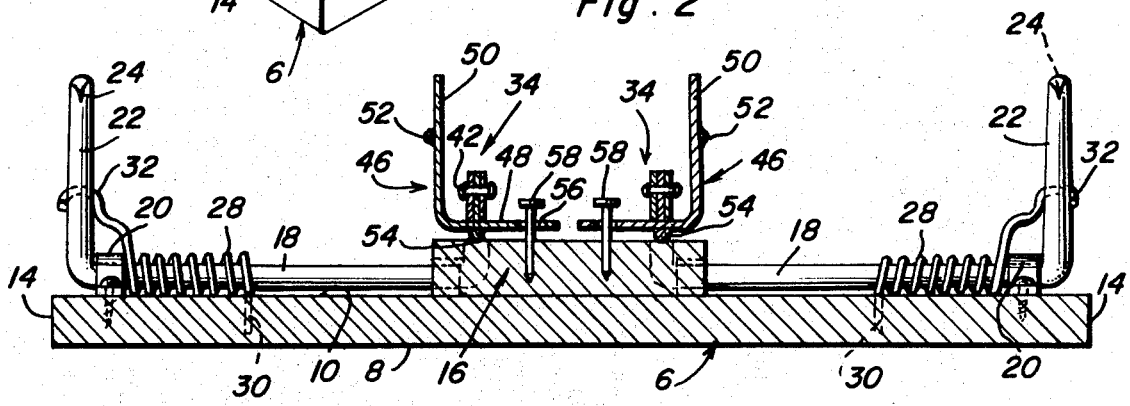
FIG. 2 is a central longitudinal sectional view taken approximately on the plane of the section line 2—2 of FIG. 1 looking in the direction of the indicating arrows.
Figure 3:
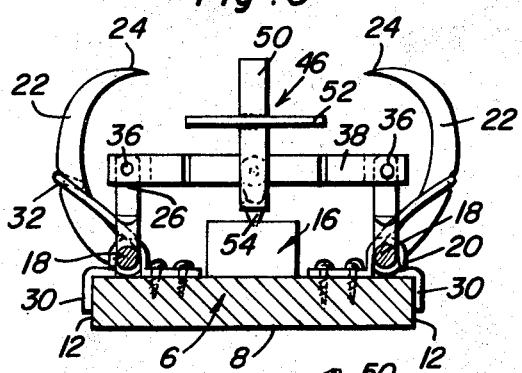
FIG. 3 is a view at right angles taken on the section line 3—3 of FIG. 1.
Figure 4:
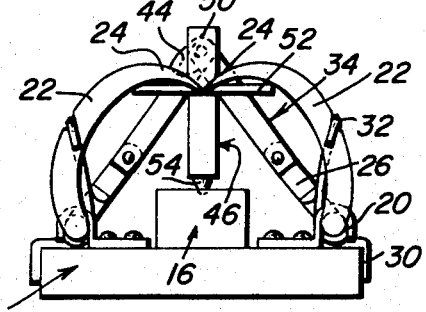
FIG. 4 is an end elevational view looking from left to right in FIG. 1 but showing the jaws released to assume animal grappling relationship.

A careful study of the views of the drawing, particularly FIGS. 1 to 3 inclusive will serve to show just how the coacting component parts of each trap coordinate when the trap is set for use (FIGS. 1 and 3 in particular). The jaws are spread apart against the tension of the springs and as the rocker arms or cranks 26 assume vertical positions the links of the toggle joint drop into position with the cam detents 44 resting atop the then underlying bottom leg 48. The trigger 46 having been properly baited assumes the set position illustrated. With both traps at the left and right in FIG. 1 set it will be evident that one or two animals can approach simultaneously or otherwise and as soon as pressure is exerted against the sensitive trigger 46 it will be activated, will rock or fulcrum and will exert pressure against the detents 44 in a manner to trip the toggle joint whereupon the springs 28 will come into play, break the toggle joint upwardly and allow the jaws to spring together from the open position (FIG. 3) to the closed position (FIG. 4) and in this manner to effectually trap the animal.

It is within the purview of the invention to make the aforementioned fulcruming lug 54 of the conical shape shown with the lower end blunt and, if desired, seated in a depression provided therefor in the top surface of the aforementioned trigger mounting and elevating block 16. This construction and arrangement will localize the position of the trigger 46 while at the same time allowing it to be quite sensitive and readily trippable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A dual purpose trap expressly designed and adapted to catch burrowing rodents, gophers and the like for example, comprising, in combination, an elongated portable panel providing a self-standing base, said panel having like end portions and an intervening centralized body portion, individual but duplicate self-contained manually set traps located atop the respective end portions of said panel, each trap characterized by a pair of opposed complemental body embracing and grappling spring-biased jaws, said jaws being proximal to an adjacent transverse marginal edge of said base panel, and animal actuated jaw setting and releasing means operatively cooperable with the aforementioned body portion of said panel, said jaw setting and releasing means comprising (1) hingedly mounted linkage means embodying links, said links being pivotally connected in end-to-end relationship, providing a toggle joint, and being operatively connected with said jaws (2) a trigger operatively oriented with the pivotally connected ends of said links, and (3) means operatively mounting said trigger on the body portion of said panel.

2. The trap defined in and according to claim 1, said trigger being L-shaped in edge elevation and embodying a horizontal bottom leg having a portion thereof trippably engageable with the pivotal connection of said links and an upstanding vertical leg bridging and extending above and beyond said links and provided with a cross pin for attachment and retention of bait.

3. The trap defined in and according to claim 2, and wherein said trigger mounting means comprises a trigger elevating block, said block being superimposed upon said panel, and the bottom leg of said trigger being operatively pinned on said block and having a fulcruming lug seated atop said block.

4. An animal trap comprising, in combination, an elongated panel constituting a base, a trigger supporting and elevating block fixed atop said base and spaced inwardly from a cooperating end of said base, paired bearing brackets mounted atop said base, a pair of horizontal spaced parallel rockshafts having inward and outward ends, said outward ends having laterally disposed upstanding animal embracing and grappling jaws, said inward ends having laterally directed upstanding rocker arms, said rockshafts residing and being seated atop underlying portions of said panel and being mounted for angular rotation in their respectively cooperable bearing brackets, coil springs encircling the rockshafts and having outer ends operatively connected to median portions of said jaws and inner ends anchored on predetermined coacting portions of said panel, linkage means embodying first and second links bridging said block and having outer ends hingedly joined to upper ends of said rocker arms and inner ends overlapped and pivotally connected together in a manner to provide a linking toggle joint between said rocker arms, and an animal actuated trigger operatively mounted on said block and operatively engageable with said toggle joint.

5. The trap defined in and according to claim 4, and wherein said trigger is L-shaped in edge elevation and embodies a horizontal bottom leg having a portion thereof trippably engageable with the pivotal connection of said links and an upstanding vertical leg bridging and extending above and beyond said links and provided with a cross pin for attachment and retention of bait.

6. The trap defined in and according to claim 5, and wherein the pivoted ends of said first and second links are provided with depending cam-like trip elements which, when the trap is set, are in ready-to-function contact with an underlying portion of said bottom leg.

7. The trap defined in and according to claim 6, and wherein the trippable portion of said bottom leg is operatively mounted atop said block by a pin and slot connection.

8. The trap defined in and according to claim 7, and wherein said jaws are arcuately longitudinally curved, are in a common plane with each other, are perpendicular to the plane of said base panel and have free terminal ends which are pointed.

References Cited

UNITED STATES PATENTS

| | | | |
|---|---|---|---|
| 998,166 | 7/1911 | Gallagher | 43—90 |
| 1,404,032 | 1/1922 | Koukal | 43—91 |
| 1,442,385 | 1/1923 | Cratty | 43—90 X |
| 2,680,323 | 6/1954 | Shaw | 43—91 |

WARNER H. CAMP, Primary Examiner

U.S. Cl. X.R.

43—94